June 2, 1953  L. C. SECORD  2,640,315
GAS TURBINE STARTER MOUNTING
Filed June 17, 1950  2 Sheets-Sheet 1

INVENTOR
L.C.SECORD
By
ATTORNEY

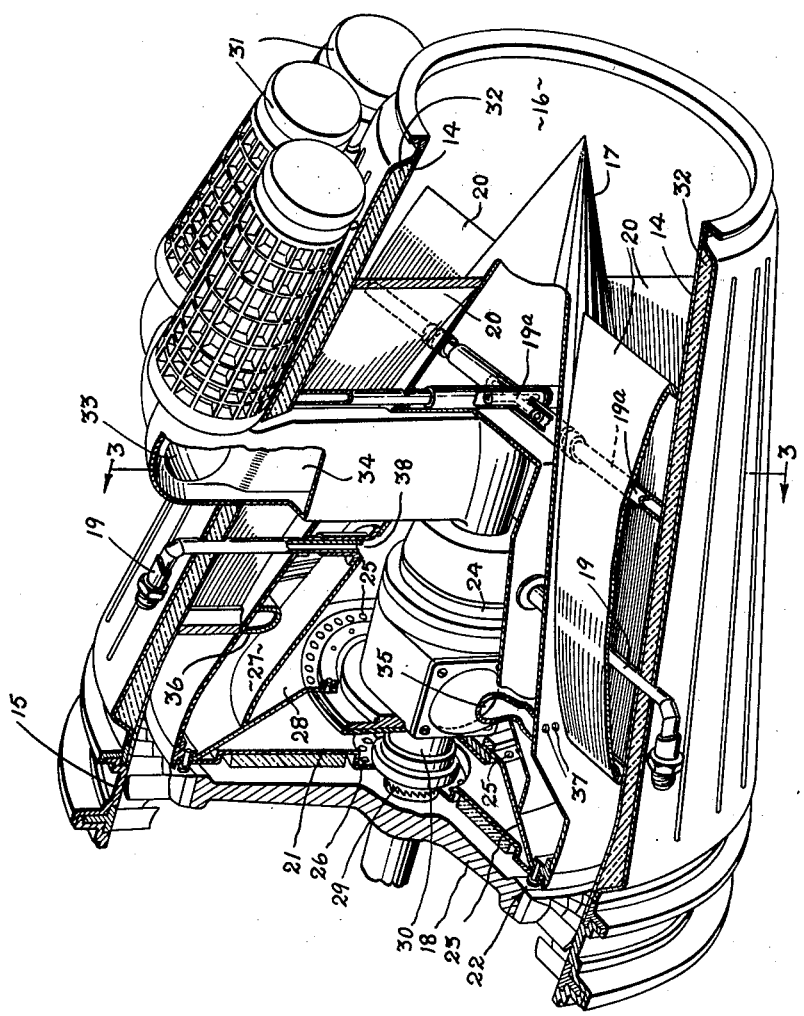

Patented June 2, 1953

2,640,315

UNITED STATES PATENT OFFICE 2,640,315

GAS TURBINE STARTER MOUNTING

Lloyd Calvin Secord, Toronto, Ontario, Canada, assignor to A. V. Roe Canada Limited, Malton, Ontario, Canada, a corporation Application June 17, 1950, Serial No. 168,720
In Great Britain June 28, 1949

5 Claims. (Cl. 60—35.6)

This invention relates to starting means for gas turbine engines and more particularly to starting means for engines used in aircraft propulsion.

Such engines normally comprise a compressor whereby air is drawn into the engine and compressed, a combustion system in which fuel is mixed with the air delivered by the compressor and the mixture burned, a turbine driven by the hot gases of combustion, and a tail cone through which these gases are exhausted from the engine. In the case of gas turbine engines for use in aircraft, the gases discharged from the tail cone are directed rearwardly through a jet pipe to generate a propulsive thrust. Auxiliary starting means are required, in such engines, for "motoring" the compressor prior to the injection of fuel so there will be a mass flow of air through the engine sufficient to sustain combustion.

In the past it has been customary to effect starting of aircraft gas turbine engines by means of a starting motor mounted on the forward end of the engine and coupled directly or by gearing to the compressor shaft. A variety of starting motors has been developed for the purpose, some operating electrically, others being powered by small internal combustion piston engines and still others utilizing the products from a chemical reaction or a cartridge charge.

A suitable starting motor for a gas turbine engine necessarily has a high torque output and so require robust shafting and gearing to transmit the torque to the main rotor of the engine. If the starter is located on the exterior of the casing at the front end, as for example in a "turbo-prop" installation, the additional weight of the shafting and gearing is a decided disadvantage. Even for an installation within the nose bullet the shafting required to connect the starter to the main engine rotor adds considerable weight.

Since many types of starters incorporate a magazine of combustible cartridges or discharge hot exhaust gases during operation, due consideration must be given to fire protection in their installation. It will be known to those skilled in the art that, as a safeguard against the high operating temperatures which are characteristic of aircraft gas turbine engines it is customary to provide a firewall across the nacelle, ahead of the combustion system, so that the engine installations, such as the fuel system, requiring protection against fire and normally grouped around the compressor casing, will be isolated from the hotter parts of the engine. Thus the region aft of the firewall is regarded as a fireproof area and starters should ideally be located therein.

If it is impracticable to mount the starting motor itself in a fireproof area, at least such equipment as cartridges and monofuel decomposers should be so located; but unfortunately an arrangement involving long intake ducts to the starting motor seriously impairs starter performance.

The exhaust gases from the starting motor may be discharged into the air stream entering the compressor but this practice is undesirable since the said gases are very hot and non-combustible. If an exhaust conduit is provided it must be of such length and so located that the exhaust gases become diluted by the atmosphere sufficiently to render them harmless before they come into contact with personnel or with the aircraft structure; the exhaust system required, therefore, adds considerable weight and complexity to the engine installation. In addition if the starting motor is mounted centrally, within the nose bullet, the exhaust conduit (and the intake duct aforementioned) must traverse the surrounding annular air intake of the compressor, and although these conduits perform no useful function except during starting, provision must nevertheless be made for prevention of ice formation thereon during atmospheric icing conditions.

It is an object of this invention to provide means for mounting a starter for a gas turbine engine, which permits flexibility in the choice of starter and results in a light and compact starter installation. It is a further object of the invention to provide means for mounting a starter for a gas turbine engine, whereby waste products of the starting process may be disposed of, without materially increasing the weight or frontal area of the engine.

The invention will be more readily understood from consideration of the following description of a preferred embodiment.

In the accompanying drawings which form a part of this application and in which like reference characters designate like parts throughout the several views:

Fig. 2 is an enlarged broken away perspective view of the aft portion of the engine showing the starter installation in greater detail.

Figure 1:
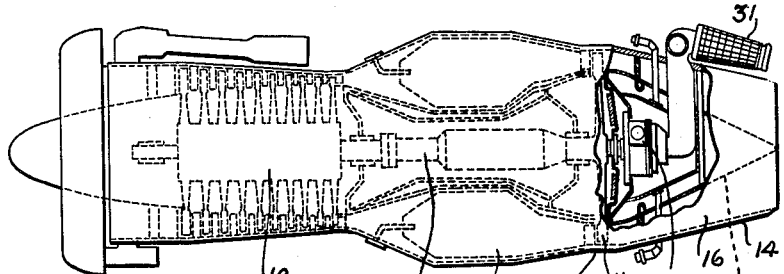
Fig. 1 is a side elevational view of a gas turbine engine showing a cartridge type starter mounted in the tail bullet of the engine, in accordance with the invention.
Figure 3:
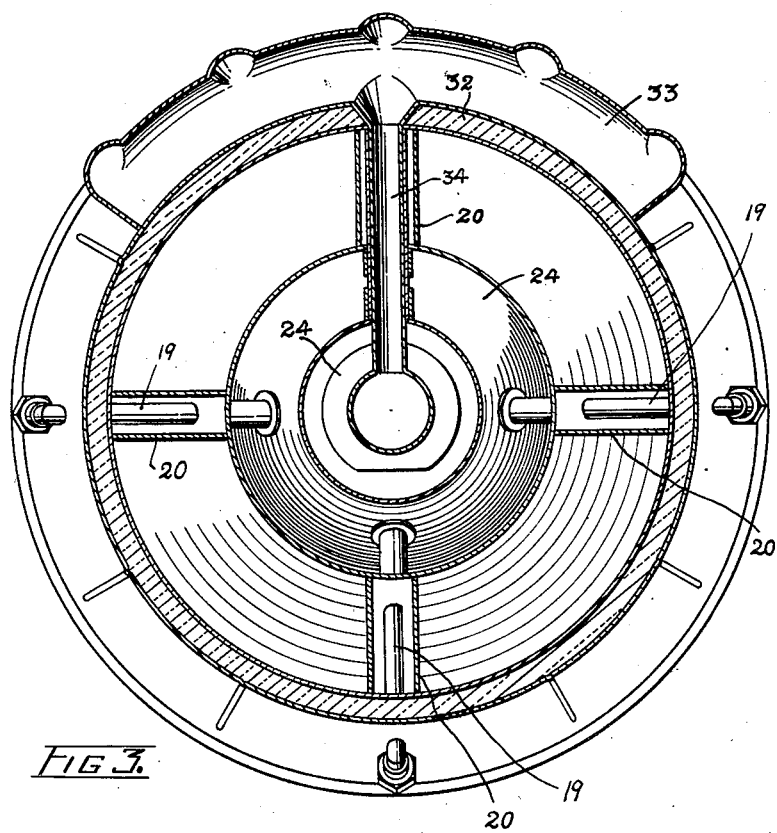
Fig. 3 is a sectional view taken on the line 3—3 in Fig. 2.

The engine illustrated in Fig. 1 comprises a compressor 10 coupled directly to a turbine 11 by a shaft 12, with a combustion system comprising six combustion chambers 13 disposed in spaced relationship around the shaft intermediate the turbine and the compressor. A tail cone 14 extends rearwardly from the turbine shroud ring 15 which surrounds the turbine; the tail cone provides the outer wall of an annular passage 16 connecting the turbine to the jet pipe (not shown), the inner wall of the passage being defined by the substantially conical tail bullet 17 situated immediately aft of the turbine rotor disc 18. The tail bullet is supported by two cruciform groups of hollow struts 19 and 19a extending radially from the tail bullet to the tail cone, the struts being enclosed in streamlined fairings 20 which provide protection against excessive heat and reduce turbulence of the exhaust stream flowing rearwardly through the tail cone.

Immediately aft of the turbine disc 18 a forward diaphragm 21 extends across the diameter of the tail bullet at its leading edge, which is spaced from the periphery of the turbine disc by a clearance gap 22. Immediately aft of the said forward diaphragm is provided a rearwardly dished diaphragm 23 which also extends across the diameter of the tail bullet near its leading edge. The rearwardly dished diaphragm has a centrally located aperture in which the starting motor 24 is mounted. In the dished and the forward diaphragms are provided annularly spaced series of apertures, 25 and 26 respectively, near their inner peripheries. Surrounding the starting motor and in spaced relationship to the tail cone bullet is a frusto-conical shroud 27 which is closed at its aft end and is attached to the dished diaphragm 23 at its forward end, thereby providing a substantially airtight compartment 28 in which the starting motor 24 is mounted; the starting motor is therefore entirely within the tail bullet. The starting motor shaft 29 projects through a central opening in the forward diaphragm 21 and it engages the rear face of the turbine disc by means of an over-running clutch. A sleeve 30, which is an extension of the starter housing, is attached to the forward diaphragm 21 and thereby furnishes a gland for the shaft.

The drawings illustrate an arrangement particularly suited for cartridge type starting motors, such as are described for instance in the December 1951 issue of "The Aeroplane," at page 793, and which comprises an impeller or small turbine wheel driven by a burst of gas supplied from an external cartridge. Several cartridge holders 31 are mounted in a convenient location on the outside of the tail cone and they are protected against overheating from the exhaust stream passing through the tail cone by a heavy layer of insulating material 32. These holders are interconnected by a manifold 33 from which extends a single conduit 34 leading to the starting motor. To minimize the number of parts located in the exhaust stream from the main turbine and to protect the conduit against burning, the said conduit is placed within one of the existing fairings 20 encasing the support struts 19 and 19a for the tail bullet; in some cases it has been found possible to use one of the struts 19 as a conduit for this purpose. The exhaust gases from the starting motor discharge into a conduit 35 to an annular manifold 36 extending circumferentially around the inner surface of the tail bullet; on the outer periphery of the manifold a series of ports 37 gives access from the manifold to the annular passage 16, so that the exhaust gases from the starting motor mix with the main exhaust stream of the engine and are ejected therewith through the tail cone.

Ports 38 in the shroud 27 register with the struts 19, thereby connecting the compartment 28 to a source of cooling air, preferably the bleed from the compressor normally used for cooling the tail bullet supports and the turbine disc.

The mechanism of the cartridge type starter assembly is conventional and will be familiar to those skilled in the art. In starting the engine, a cartridge in one of the holders 31 is fired and the resulting hot gases are directed into the manifold 33 under pressure and thence to the conduit 34 whereby they are ducted to the starting motor 24. These gases energize the starting motor which engages the turbine 11, thereby driving the compressor 10 through the shaft 12. Rotation of the compressor induces a flow of air sufficient to support the combustion process, and if fuel now be injected into the combustion chamber 13 and ignited by a suitable spark or torch igniter, the engine will start; the starting motor being no longer required is automatically disengaged by the over-running clutch. The exhaust gases from the starting motor are conducted into the main exhaust stream of the engine, as previously described.

Once the engine is in operation, a stream of cooling air bled from the compressor is ducted through the struts 19 into the airtight compartment 28 which surrounds the starting motor. This air circulates around the motor, keeping it cool, and then passing through the apertures or vents 25 and 26 in the diaphragms 23 and 21 respectively, it impinges on the rear face of the turbine disc 18. As may be seen most readily in Fig. 2, the arrangement is such that the cooling air after bathing the starting motor, escapes through the apertures in the rear diaphragm and surrounds the shafting means including sleeve 30, and thereafter escapes through the vents in the front diaphragm into the turbine clearance gap space 22, the result being to cool in succession the starting motor, the shafting means, and the turbine discs. The cooling air then flows outwardly to the periphery of the disc where it escapes through the clearance gap 22 between the disc and the tail bullet assembly.

The extremely high temperature of the combustion gases passing through the tail cone makes some form of protective cooling for the starting motor imperative; this has been provided, in the manner described, by situating the motor in the stream of cooling air which is normally supplied to cool the tail bullet supports and the rear face of the turbine. In addition, the outer surface of the shroud 27 may be given a brightly polished finish so it will act as a shield against heat radiated from the wall of the tail bullet.

In aircraft installations the starting motor is normally required to operate only for brief periods when the engine is cold and therefore cooling requirements for the starter are not as critical as those for other accessories, functioning concurrently with the engine. Considerable advantage results from locating the starting installation, with its limited cooling requirements, to the rear of the engine in the tail bullet, thereby leaving more available space for mounting of other accessories in the nose bullet which is efficiently cooled.

It will be recognized by those familiar with the problems of starter installations, that an installation of the type described, making use of existing structural parts and utilizing what would otherwise be waste space, imposes a minimum penalty in additional complexity, weight, and frontal area. A further advantage of this arrangement is that the exhaust gases from the starter may be discharged directly into the turbine exhaust in the tail cone, which is designed to withstand very high temperatures, and therefore special precautions in dealing with the starting motor supply and exhaust need not be observed, with further saving in weight. Furthermore the installation is in no way involved in the anti-icing requirements of the engine.

It is to be understood that the form of the invention herewith shown and described is to be taken as an example of the same, suitable to the cartridge type of starter described herein, and that other types of starters may be similarly mounted in the tail bullet of the engine with equal advantage; furthermore the streamlined fairings surrounding the tail bullet struts may be adapted to carry some or all of the structural loads and the struts would then serve only as ducts for the cooling air and would have no structural significance. Such various changes in the shape, size and arrangement of the parts may, therefore, be resorted to without departing from the scope of the subjoined claims.

What I claim as my invention is:

1. A gas turbine engine comprising a rotary air compressor at the inlet end, a gas combustion system, a turbine at the outlet end driving the compressor, a tail cone mounted aft of the turbine, a hollow generally conical tail bullet centrally supported within and spaced from the tail cone and defining therewith an annular exhaust passage for the turbine, a first diaphragm disposed opposite the turbine with a clearance gap therebetween and providing a front wall for the tail bullet, a shroud closed at its aft end supported within and spaced from the tail cone, a second diaphragm disposed aft of the first diaphragm and closing the foward end of the shroud to define therewith a closed compartment, a starting motor located within the compartment, shafting means passing centrally through both said diaphragms and coupling the motor to the turbine, the first diaphragm having apertures therein spaced around the shafting means and the second diaphragm having apertures opening into the compartment, and means supplying cooling air under pressure to the compartment whereby said air cools the motor and, escaping through the apertures in the diaphragms, cools in succession the shafting means and the turbine.

2. A gas turbine engine comprising a rotary air compressor at the inlet end, a gas combustion system, a turbine at the outlet end driving the compressor, a tail cone mounted aft of the turbine, a hollow generally conical tail bullet, radial struts supporting the tail bullet centrally within the tail cone to define an annular exhaust passage for the turbine, a first diaphragm disposed opposite the turbine with a clearance gap therebetween, said diaphragm being fastened peripherally to the tail bullet and providing a front wall therefor, a shroud closed at its aft end supported within and spaced from the tail cone, a second diaphragm disposed aft of the first diaphragm and peripherally supported therefrom, said second diaphragm closing the forward end of the shroud to define therewith a closed compartment, a starting motor located within the compartment and fastened to the second diaphragm, shafting means passing centrally through both said diaphragms and coupling the motor to the turbine, the first diaphragm having a series of apertures annularly spaced around the shafting means and opening forward into the clearance gap, the second diaphragm having apertures opening aft into the compartment, and means supplying cooling air under pressure to the compartment whereby said air cools the motor and, escaping through the apertures in the first and second diaphragms successively, cools in succession the shafting means and the turbine.

3. A gas turbine engine comprising a rotary air compressor at the inlet end, a gas combustion system, a turbine at the outlet end driving the compressor, a tail cone mounted aft of the turbine, a hollow generally conical tail bullet, radial struts supporting the tail bullet centrally within the tail cone to define an annular exhaust passage for the turbine, a first diaphragm disposed opposite the turbine with a clearance gap therebetween, said diaphragm being fastened peripherally to the tail bullet and providing a front wall therefor, a shroud closed at its aft end supported within and spaced from the tail cone, a second diaphragm disposed aft of the first diaphragm and peripherally supported therefrom, said second diaphragm closing the forward end of the shroud to define therewith a closed compartment, at least one of the struts being hollow and projected through the tail bullet and shroud into the closed compartment, a starting motor located within the compartment and fastened to the second diaphragm, shafting means passing centrally through both said diaphragms and coupling the motor to the turbine, the first diaphragm having a series of apertures annularly spaced around the shafting means and opening forward into the clearance gap, the second diaphragm having apertures opening aft into the compartment, and means supplying cooling air under pressure through the hollow strut into the compartment whereby said air cools the motor and, escaping through the apertures in the first and second diaphragms successively, cools in succession the shafting means and the turbine.

4. A gas turbine engine comprising a rotary air compressor at the inlet end, a gas combustion system, a turbine at the outlet end driving the compressor, a tail cone mounted aft of the turbine, a hollow generally conical tail bullet centrally supported within and spaced from the tail cone and defining therewith an annular exhaust passage for the turbine, a first diaphragm disposed opposite the turbine with a clearance gap therebetween and providing a front wall for the tail bullet, a shroud closed at its aft end supported centrally within and spaced from the tail cone with an annular space therebetween, a second diaphragm disposed aft of the first diaphragm and closing the forward end of the shroud to define therewith a closed compartment, a gas impeller starting motor located within the compartment, shafting means passing centrally through both said diaphragms and coupling the motor to the turbine, the first diaphragm having apertures therein spaced around the shafting means and the second diaphragm having apertures opening into the compartment, means supplying cooling air under pressure to the compartment whereby said air cools the motor and, escaping through the apertures in the diaphragms, cools in succession the shafting means and the turbine, a conduit leading from the exterior of the tail cone and passing through the tail bullet and shroud to the motor for supplying a motive gas thereto, a manifold located in said annular space between the tail bullet and the shroud and registering with ports in the tail bullet opening into said annular exhaust passage, and a conduit connecting the motor to the manifold for conducting the spent motive gas thereof into the annular exhaust passage.

5. A gas turbine engine comprising a rotary air compressor at the inlet end, a gas combustion system, a turbine at the outlet end driving the compressor, a tail cone mounted aft of the turbine, a hollow generally conical tail bullet, radial struts supporting the tail bullet centrally within the tail cone to define an annular exhaust passage for the turbine, a first diaphragm disposed opposite the turbine with a clearance gap therebetween, said diaphragm being fastened peripherally to the tail bullet and providing a front wall therefor, a shroud closed at its aft end supported centrally within and spaced from the tail cone with an annular space therebetween, a second diaphragm rearwardly dished and disposed aft of the first diaphragm and peripherally supported therefrom, said second diaphragm closing the forward end of the shroud to define therewith a closed compartment, a gas impeller starting motor located within the compartment, shafting means passing centrally through both said diaphragms and coupling the motor to the turbine, the first diaphragm having apertures therein spaced around the shafting means and the second diaphragm having apertures opening into the compartment, means supplying cooling air under pressure to the compartment whereby said air cools the motor and, escaping through the apertures in the diaphragms, cools in succession the shafting means and the turbine, a conduit leading from the exterior of the tail cone and passing through the tail bullet and shroud to the motor for supplying a motive gas thereto, an annular exhaust manifold located in said annular space between the tail bullet and the shroud and extending circumferentially around the interior surface of the tail bullet and registering with ports therein opening into said annular exhaust passage, and a conduit connecting the motor to the manifold for conducting the spent motive gas thereof into the annular exhaust passage.

LLOYD CALVIN SECORD.

References Cited in the file of this patent

UNITED STATES PATENTS

| Number | Name | Date |
|---|---|---|
| Re. 23,198 | Anxionnaz et al. | Feb. 21, 1950 |
| 2,411,552 | New | Nov. 26, 1946 |
| 2,452,298 | Goode | Oct. 26, 1948 |
| 2,457,833 | Redding | Jan. 4, 1949 |
| 2,479,573 | Howard | Aug. 23, 1949 |
| 2,489,683 | Stalker | Nov. 29, 1949 |
| 2,559,006 | Clapham | July 3, 1951 |

FOREIGN PATENTS

| Number | Country | Date |
|---|---|---|
| 616,695 | Great Britain | Jan. 26, 1949 |
| 617,474 | Great Britain | Feb. 7, 1949 |

OTHER REFERENCES

N. A. C. A. Technical Note #1149, November 1946, Figures 4a, 5a, 6a, and 8a.

"Flight," February 6, 1947, pages 142a–b, 143–145.